United States Patent [19]
Page et al.

[11] 3,931,008
[45] Jan. 6, 1976

[54] APPARATUS FOR THE TREATMENT OF LIQUID WASTES

[75] Inventors: Jean-Claude Page, Fribourg; Armand Rappaz, Villars-sur-Glane; Ulrich Frauchiger, Marly, all of Switzerland

[73] Assignee: Ciba-Geigy AG, Basel, Switzerland

[22] Filed: Nov. 21, 1974

[21] Appl. No.: 525,907

Related U.S. Application Data

[63] Continuation of Ser. No. 361,901, May 21, 1973, abandoned.

[30] Foreign Application Priority Data
June 8, 1972 Switzerland.......................... 8506/72

[52] U.S. Cl. .............. 210/104; 210/195; 210/196; 210/202
[51] Int. Cl.² ........................................ B01D 21/08
[58] Field of Search ................... 210/60, 194–197, 210/200, 201, 202, 205, 253, 261, 262, 104, 123, 138

[56] References Cited
UNITED STATES PATENTS

| | | | |
|---|---|---|---|
| 1,149,045 | 8/1915 | Greth et al........................... | 210/202 |
| 1,747,803 | 2/1930 | Travers............................ | 210/253 X |
| 3,485,749 | 12/1969 | Reilly................................ | 210/262 X |
| 3,679,053 | 7/1972 | Koulovatos et al............. | 210/202 X |
| 3,755,156 | 8/1973 | Yakovlev et al.................. | 210/60 X |

Primary Examiner—Charles N. Hart
Assistant Examiner—Robert H. Spitzer
Attorney, Agent, or Firm—Joseph G. Kolodny; Edward McC. Roberts; Prabodh I. Almaula

[57] ABSTRACT

An apparatus which is suitable for the treatment of at least two liquid wastes which are chemically not compatible with one another, which comprises an addition zone for the addition of treatment substances to the wastes, a sedimentation zone for the separation of precipitates and liquid and a dilution zone in which the liquid separated off in the sedimentation zone is diluted with water and the liquid diluted in this way is run off, is improved by that, for each of the liquid wastes which are chemically not compatible with one another, separate chambers are provided in the addition zone and in the sedimentation zone, that the addition zone is located lowest in the apparatus, the dilution zone is located above the addition zone and the sedimentation zone is located above the dilution zone, that to each of the chambers of the addition zone there is allotted an inlet for treatment substances which can make the waste in question compatible with the other waste or the other wastes, that each of the chambers of the addition zone is equipped with a pump which on the one hand serves to circulate liquid waste and treatment substance through the particular chamber of the addition zone and on the other hand feeds waste, mixed with treatment substance, into the appropriate chamber of the sedimentation zone, and that in each chamber of the sedimentation zone a filter element is provided through which liquid separated from precipitates flows into the conjoint dilution zone, preferably under the action of gravity.

3 Claims, 2 Drawing Figures

APPARATUS FOR THE TREATMENT OF LIQUID WASTES

This is a continuation, of application Ser. No. 361,901, filed May 21, 1973, now abandoned.

BACKGROUND OF THE INVENTION

The invention relates to an apparatus for the treatment of liquid wastes and above all to an apparatus which is suitable for the treatment of at least two liquid wastes which are chemically not compatible with one another.

By "liquid wastes" are here understood wastes of commercial or industrial production and processing plants which, because of their chemical nature or their content of chemical substances, have an excessive polluting action on water and must therefore not be run, without pretreatment, into the general effluent systems, sewage installations, settling basins, streams and the like. By wastes which are "chemically not compatible with one another" there are designated wastes which react chemically with one another and which thereby form precipitates, foam, gases or other toxic substances which pollute waters and/or the atmosphere. The chemical substances, for example metals such as copper or silver, contained in these liquid wastes may warrant recovery.

OBJECTS AND SUMMARY OF THE INVENTION

The objective of the invention is now so to treat all liquid types of waste from an industrial plant, especially wastes which can be collected as at least two liquid wastes which are chemically not compatible with one another, that these wastes are converted in such a way that they can all be combined with one another and then be diluted and can, in the diluted state, be run, without misgivings, into public sewage systems and into waters.

It is a further objective of the invention to provide an apparatus in which the use of pumps is restricted as far as possible and the transport of quantities of liquid of substantial volume takes place, as far as possible, under the action of gravity.

A preferred objective of the invention is, at the same time, the isolation of products which separate out and from which valuable chemical substances can be recovered, as by-products of the conversion of one or more of the liquid wastes into liquids which can be diluted, are compatible with one another and can be run out without misgivings, as described above.

Finally, a further objective of the invention is the provision of an apparatus suitable for the above-mentioned purposes which is particularly simple in design and which can be set up close to a machine which produces wastes and can be directly connected to this machine.

According to the invention, these objectives are achieved by an apparatus which is suitable for the treatment of at least two liquid wastes which are chemically not compatible with one another, which comprises an addition zone for the addition of treatment substances to the wastes, a sedimentation zone for the separation of precipitates and liquid and a dilution zone in which the liquid separated off in the sedimentation zone is diluted with water and the liquid diluted in this way is run out, and which is characterised in that for each of the liquid wastes which are chemically not compatible with one another separate chambers are provided in the addition zone and in the sedimentation zone, that the addition zone is located lowest in the apparatus, the dilution zone is located above the addition zone and the sedimentation zone is located above the dilution zone, that to each of the chambers of the addition zone there is allotted an inlet for treatment substances which can make the waste in question compatible with the other waste or the other wastes, that each of the chambers of the addition zone is equipped with a pump which on the one hand serves to circulate liquid waste and treatment substance through the particular chamber of the addition zone an on the other hand feeds waste, mixed with treatment substance, into the appropriate chamber of the sedimentation zone, and that in each chamber of the sedimentation zone a filter element is provided through which liquid separated from precipitates flows into the conjoint dilution zone, preferably under the action of gravity.

If the liquid wastes of a plant can only be combined into three varieties which are not chemically compatible, three addition chambers are required in the addition zone and three sedimentation chambers may be required. However, in most cases two chambers suffice in each of these zones.

Preferably, means are provided for limiting the level of the liquid waste in each chamber of the addition zone, and these means switch the corresponding circulating pumps on or off. The inlet for the treatment substances mentioned also preferably comprises supply vessels for the latter which are located above the level of the addition zone so that the treatment substances can flow into the corresponding chambers of the addition zone under the action of gravity.

It is also possible to provide a return pipeline for liquid, freed of precipitates, from a filter element in one of the chambers of the sedimentation zone into a chamber of the addition zone, which makes possible renewed treatment of the liquid with a desired treatment substance and renewed circulation through the sedimentation zone.

It is also advantageous to provide means of control which regulate the proportion of liquid component, mixed with treatment substance, which is returned into a chamber of the addition zone during circulation, and which proportion is fed upwards into the corresponding chamber of the sedimentation zone.

BRIEF DESCRIPTION OF THE DRAWING

The apparatus according to the invention will now be explained in detail with reference to the attached drawings, in relation to a preferred embodiment with two chambers in the addition zone and two chambers in the sedimentation zone. In the drawings.

DESCRIPTION OF THE EMBODIMENT

Figure 1:
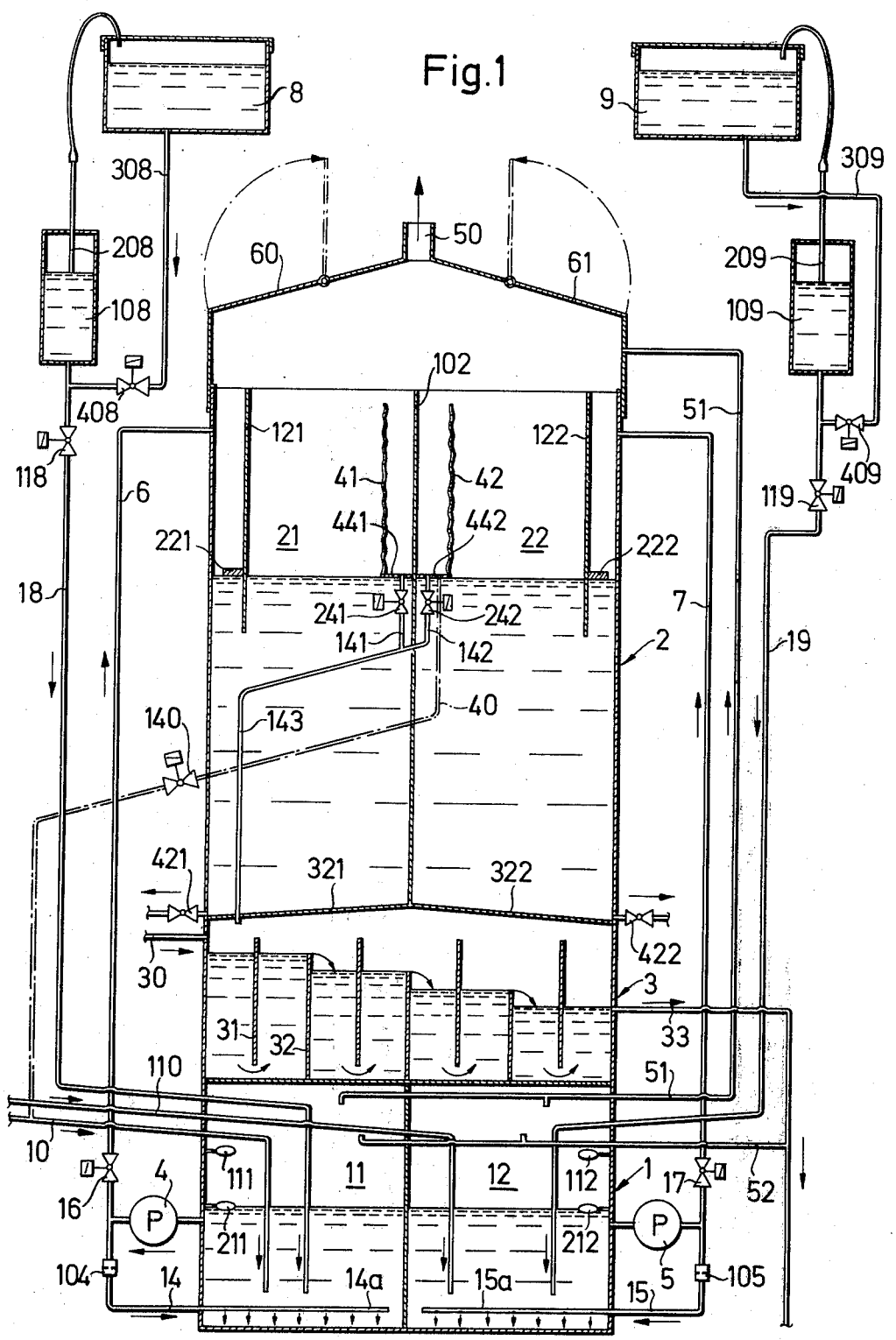
FIG. 1 shows a schematic representation of the apparatus.

In the drawings, the addition zone located in the lower part of the apparatus is marked 1, the sedimentation zone located in the upper part of the apparatus is marked 2 and the dilution zone located between the former two zones is marked 3. The addition zone 1 comprises two chambers 11 and 12 into which liquid wastes to be treated flow under the action of gravity, from an industrial plant, via the feed pipelines 10 and 110; the flow depends on the amount of waste which arises and can be, for example, in irregular minor or major amounts, with or without pauses in the flow, or can be continuous and possibly also regular.

To each of the chambers 11 and 12 there is allotted a circulating pump or feed pump 4 or 5, respectively, by means of which liquid waste from the chambers can circulate via distributor pipelines 14 or 15, respectively, which are preferably provided with a perforated end piece 14a or 15a, respectively. Furthermore, a feed pipeline 6 or 7, respectively, leads upwards from the pump 4 or 5, respectively, into the sedimentation zone which has a corresponding number, namely two, chambers 21 and 22. The feed pipeline 6 opens into the upper part of the sedimentation chamber 21 near the chamber wall and the pipeline 7 correspondingly opens into the upper part of the sedimentation chamber 22.

The feed pipelines 6 and 7 are provided with shut-off valves 16 or 17 respectively; if, for example, the valve is closed and pump 4 is in operation, only liquid wastes circulates via pipeline 14 through chamber 11 whilst if valve 16 is open a greater or lesser proportion of the liquid waste from chamber 11 is pumped via the feed pipeline 6 up into the sedimentation chamber 21. The proportion of the amount pumped up is regulated by a control element 104, or 105, respectively, which is constructed, for example, as an adjustable or replaceable diaphragm.

Treatment substance is fed to the chambers 11 and 12 of the addition zone 1 from supply vessels 8 and 9, located above the level of the addition zone, via pipelines 18 or 19, respectively, in which are provided metering devices 108 or 109, respectively, with pipettes 208 or 209, respectively. In a manner which is in itself known, the desired amount of treatment substance is adjusted in the metering chamber 108, 109, by adjusting an appropriate level of the pipette orifice, and treatment substance is then introduced via a by-pass pipeline 308 or 309, respectively, by opening a shut-off valve 408 or 409, respectively, located in the latter, a shut-off valve 118 or 119, respectively, built into the feed pipeline 18 or 19, respectively, below the metering device 108, 109 and the point of entry of the by-pass pipeline 308, 309, being shut. After introducing the dose of treatment substance into the metering device 108 or 109, respectively, the valve 408 or 409, respectively, is shut and the dose of treatment substance is run into the addition chamber 11 or 12, respectively, by opening the valve 118 or 119, respectively.

In each of the chambers 11 and 12 of the addition zone there are additionally fitted limiting devices in the form of an upper level switch 111 or 112, respectively, and a lower level switch 211 or 212, respectively, of which the upper level switch 111 or 112, respectively, starts the corresponding pump 4 or 5, respectively, as soon as the level of the liquid waste in the chamber reaches the switch, and at the same time an acoustic or optical warning signal is actuated, which indicates that the further flow of liquid waste into the particular chamber of the addition zone must be interrupted. The valve 16 or 17, respectively, of the feed pipeline initially remains closed. At the same time, the upper level switch 11 or 12, respectively, can also cause the filling of the metering device 108 or 109, respectively, unless this has already taken place independently of the level of the waste in the addition chamber.

After a certain interval of time which can be set by means of a timer or the like, the valve 16 or 17, respectively, is opened and liquid waste, which has not yet been treated when the apparatus is started up, is pumped up into the sedimentation chamber 21 or 22, respectively, whilst at the same time, depending on the size of the diaphragm 104 or 105, respectively, a certain circulation of the content of the chamber 11 or 12, respectively, is maintained. As soon as the level of the liquid contents of the chamber 11 or 12, respectively, drops below the switch 111 or 112, respectively, the warning signal is switched off and, unless this has already taken place beforehand, the valve 408 and 409, respectively, of the by-pass pipeline 308 or 309, respectively, for the treatment substance is shut.

As soon as the level of the liquid contents of chamber 11 or 12, respectively, drops as far as the lower level switch 211 or 212, respectively, valve 16 or 17, respectively, is closed and valve 118 or 119, respectively, of the feed pipeline 18 or 19, respectively is opened so that treatment substance flows into the particular addition chamber 11 or 12, respectively. The amount of treatment substance corresponds to that which is necessary to treat the next charge of liquid waste, the volume of which corresponds to that of the chamber 11 or 12, respectively, between the upper and the lower switch (111 and 211 or 112 and 212, respectively).

After a certain interval of time, which can be set by means of a timer, the valve 118 or 119, respectively, is closed.

Whilst the treatment substance is flowing in, the pump 4 or 5, respectively, can be switched off, which can be controlled by the lower switch 211 or 212, respectively, when the level of liquid waste in the chamber 11 or 12, respectively, falls below this switch, or the pump can continue to run for some time and cause more rapid mixing of waste and of treatment substance which is running in, through circulating these two. The switching off of the pump can then be controlled by a timer, for example by the same timer which causes the valve 118 or 119, respectively, to close.

The volume of liquid waste and treatment substance which remains below the lower level switch 211 or 212, respectively, in the chamber 11 or 12, respectively, plays the role of a "buffer" liquid, in that it reduces fluctuations in the chemical composition and the temperature, such as can occur in the reaction which takes place between the liquid waste and the treatment substance. On the other hand, the chamber volume enclosed between the upper and the lower level switch should be at least as great as the total volume of the particular type of liquid waste from the industrial plant which arises during a particular working period, for example during the course of one day.

In order to achieve as trouble-free sedimentation as possible of the precipitates which arise in the sedimentation chambers 21 or 22, respectively, the feed pipeline 18 or 19, respectively, opens into the upper wall region of the chamber, as already stated. Furthermore, a shield 121 or 122, respectively, is provided opposite the orifice of the feed pipeline 18 or 19, respectively, in the interior of the chamber 21 or 22, respectively, and at the lower end of the shield means for narrowing of the flow cross-section between the chamber wall and the shield, for example a disc-shaped float or a strip 221 or 222, respectively, fixed to the shield are provided. This forces the liquid issuing from the orifice of the feed pipeline 6 or 7, respectively, to flow along the wall of the sedimentation chamber 21 or 22, respectively, into the liquid within the chamber, without causing turbulence which interferes with the sedimentation. The lower end of the shield 121 or 122, respectively, should always dip into the liquid accumulated in the chamber.

Precipitates in the liquid accumulated in the lower part of the sedimentation chamber 21 or 22, respectively, sediment on the bottom 321 or 322, respectively, of the chamber, which is preferably inclined outwards, and can periodically be withdrawn through an outlet valve 421 or 422, respectively, and be further processed, if appropriate, to recover valuable substances, such as, for example, metals.

The supernatant liquid, free of precipitate, which forms in the middle part of the sedimentation chamber during the decanting process is withdrawn as follows. In the region of the liquid level, a filter element 41 or 42, respectively, if fitted in the sedimentation chamber 21 or 22, respectively, being mounted on the wall of the chamber, preferably at a distance from the inlet point for liquid from the feed pipeline 6 or 7, respectively. The supernatant liquid now flows through the filter element, (a valve 140 in the return pipeline being closed), via outlet pipelines 141 or 142, respectively, which are provided with shut-off valves 241 and 242 and which open into a conjoint pipeline 143, continuously into the dilution zone 3 which is constructed as a single chamber with various baffles 31 and 32 which accelerate mixing with water from the pipeline 30. The valve 140 in the return pipeline 40 is closed during this process. The effluent thus obtained from dilution of the supernatant liquid from the sedimentation chamber 21 or 22, respectively, with water, which has a content of impurities which is permissible for running out into public sewers or waters, is removed from the apparatus via outlet pipeline 33.

Gaseous substances released in the apparatus during the reaction between liquid wastes and treatment substances or even already during the treatment of such wastes are drawn off through the extraction hood 50, which covers the chambers of the sedimentation zone and into which also enters an extraction pipeline 51, from the chambers 11 or 12, respectively, of the addition zone, for the purpose of withdrawing gases already evolved in the addition zone.

If desired, the reaction between the liquid waste and the treatment substances can also be accelerated by warming, especially by warming the addition zone. However, appropriate heating devices have not been shown in the drawings, for reasons of clarity.

Finally, for safety purposes, an overflow pipeline 52 can also be provided in the chambers 11 and 12.

All valves, as well as the pumps, can be controlled electromagnetically, or in some other suitable form, from a central monitoring point.

In addition to the return pipeline 40 which leads from the filter element 42 or the sedimentation chamber 22 into the addition chamber 11, it is of course also possible to have a corresponding pipeline from the filter element 41 into the addition chamber 12, and equally a return pipeline can also lead from the filter 41 into the chamber 11 and a further return pipeline from the filter element 42 into the chamber 12.

In the extraction hood 50, flaps 60 or 61, respectively, are provided, through which filter elements 41 or 42, respectively, which have become unusable can be removed and replaced by new filter elements.

However, before this is done, the liquid level in the particular sedimentation chamber must be lowered, by running out sludge and liquid from the appropriate outlet valve (421 or 422, respectively), to below the level of the filter element, so that liquid which has not been filtered cannot enter the outlet pipelines 141 or 142, respectively.

Figure 2:
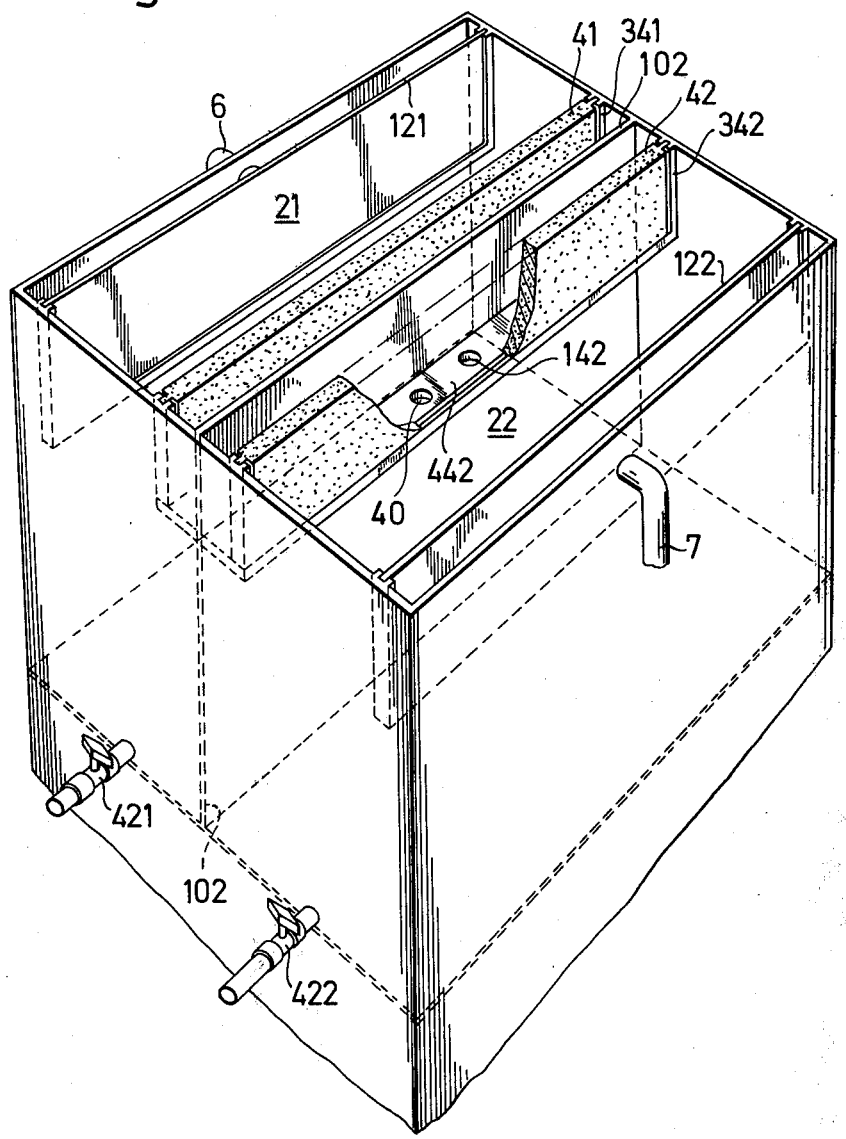
FIG. 2 shows a perspective view, partly in section, of a preferred arrangement of the filter elements in two chambers of the sedimentation zone, in accordance with the embodiment shown in FIG. 1.

FIG. 2 shows a preferred arrangement of the filter elements 41 and 42 in the two sedimentation chambers 21 and 22. The filter elements are here constructed as plates, for example of felt or filter paper or of a similar material suitable for filtration, and are inserted in frames 341 or 342, respectively, whilst the filter space between each of the filter plates and the middle wall 102 which is common to the two sedimentation chambers 21 and 22 is closed at its lower end, at the height of the desired level of the liquid to be decanted in the chambers 21 and 22, by a transverse wall 441 or 442, respectively, in which are located the inlet orifices of the outlet pipelines 141 or 142, respectively, and of the return pipelines, of which only pipeline 40 from the sedimentation chamber 22 into the addition chamber 11 is shown.

By means of the apparatus described above it is thus possible to modify two or more liquid wastes which are chemically compatible with one another in such a way that they are mixed and diluted with one another and can then be run out as ordinary effluents which meet the legal stipulations regarding non-pollution of waters, into appropriate installations or into running waters.

Since the apparatus according to the invention can be kept as small as desired, it can be connected equally well to installations of small size as to larger installations.

The industrial or commercial plants of which liquid effluents can be treated in this way include also, above all, (those concerned with) effluents from photographic developing processes.

The preferred manner of use of the apparatus in practice is now first described in relation to an example from photographic developing. In a photographic silver dye bleach process, such as is described in German Pat. No. 1,154,345, the liquid wastes are combined into two groups in order to convert them, in the apparatus described above, into effluents which meet the leqal stipulations regarding the non-pollution of waters. In particular, (A) a liquid waste, containing copper, from the silver bleaching and the dye bleaching, and (B) a liquid waste, containing silver, from the developing, the stop-fixing, the actual fixing and the stabilizing, are formed.

A liquid waste according to (A) is run into the chamber 11 which should be designed for a buffer volume of 30 liters below the lower switch 211, whilst the working volume between the switches 211 and 111 is designed for 15 liters. As the treatment substance, the amount required for the reaction, namely about 3 liters, of 30% strength sodium hydroxide solution is introduced through the pipeline 18, as a result of which, after pumping 15 liters of the resulting mixture up into the sedimentation chamber 21, a sludge settles out, from which copper can be recovered.

The liquid waste (B) is run into the addition chamber 22, which is designed in the same dimensions, and is mixed therein with about 2 to 2.5 liters of 30% strength hydrogen peroxide from pipeline 19. This oxidises the content of sulphite, thiosulphate and developer, for example 1-methylamino-4-hydroxybenzene ("methol") in the waste, and gives a precipitate, in the sedimentation chamber 22, from which the silver can be recovered. The supernatant liquids from the chambers 21 and 22 then pass through the filter plates 41 or 42, respectively, via the pipelines 141 or 142, respectively, and the conjoint pipeline 143, into the dilution zone 3, where their mixture is diluted with water.

The amount of hydrogen peroxide added in chamber 12 can be kept relatively low since a proportion of the sulphite to be oxidised can be oxidised to sulphate, on mixing the two liquids in pipeline 143 and the dilution zone 3, by oxidising substances originating from waste (A) and still present in the liquid from chamber 21, and can at the same time be neutralized by excess sodium hydroxide solution in the liquid from chamber 21.

Both the residual content of chemical substances and the pH value of the effluent obtained in dilution zone 3 then meets the legal stipulations, so that the effluent can be charged into waters or effluent installations.

If the precipitate in one or other sedimentation chamber is too fine, which can be recognized without difficulty through the material passing through the filter, the supernatant liquid in question can be returned once more into the corresponding addition chamber.

Apart from the preferred use of the apparatus according to the invention, described above, the apparatus can however also be used in other ways. Thus, for example, all spent baths which arise in developing photographic chromogen direct-viewing material can be combined with one another since they are more readily compatible with one another than the baths from the abovementioned silver bleach process, and the waste mixture can first be introduced into the addition chamber 12 of the apparatus. Here an amount, determined by preliminary test, of 30% strength hydrogen peroxide, (say of the order of magnitude of 1 liter) is introduced into the mixture and the mixture (about 15 liters) is then pumped up into the sedimentation chamber 22. The resulting grey sludge, which contains considerable amounts of silver iodide or silver bromide, can then be worked up to recover the silver.

The supernatant liquid passes through the filter element 42 and is passed via pipeline 40 into the addition chamber 11 and neutralised in the latter with sodium hydroxide solution. Only a relatively small amount of the latter is required for this purpose, since the liquid from chamber 22 is not excessively acid (pH about 5). Since the salt content of the liquid finally run out from the sedimentation chamber 21 via pipelines 141 and 143 into the dilution zone 3 is rather high, a correspondingly higher content of wash water must be added than in the example of the silver dye bleach process.

The amount of water to be added in the dilution zone 3 varies, in the design of the apparatus assumed above, between about 4 and about 70 liters per minute. In the first example, amounts near the lower limit of this range in most cases suffice whilst in the second example it is necessary to work nearer the upper limit.

Since the parts of the apparatus which form the chambers can all be manufactured from chemically resistant plastic, for example polypropylene, the entire apparatus is relatively easy to manufacture and simple to erect in the desired position in the factory, and to connect up.

The apparatus is of particularly simple design compared to installations previously used for the treatment of wastes from photographic developing. It does not require special pH measuring instruments or Redox probes, such as generally required to be used in other cases. Because of its low space requirement and the particular arrangement of its three stages, the apparatus can be accommodated directly next to a developing machine and be connected directly thereto, in contrast to the much more voluminous know apparatuses in which the treatment takes place in addition zones, sedimentation zones and dilution zones which are arranged in cascade form. Once the apparatus has been set for the particular machine, frequent controls are superfluous if the same developing process is adhered to.

We claim:

1. An apparatus for the treatment of at least two liquid wastes which are chemically incompatible with one another, comprising at least two addition chambers for receiving respective wastes, a common dilution chamber above said addition chambers, at least two sedimentation chambers above said dilution chamber, inlet means for introducing a respective liquid waste into each of said addition members, inlet means for introducing a respective treating substance into each of said addition chambers, at least two pumps each respectively connected with one of said addition chambers, respective pipe means connecting each pump with one of said sedimentation chambers and for recirculating liquid from said one addition chamber back thereto, means for removing sediment from said sedimentation chambers, filter chambers each associated with a respective one of said sedimentation chambers for collection of filtered overflow therein, conduit means for receipt of overflow from said sedimentation chambers and delivery to said common dilution chamber, means for introducing diluent to said dilution chamber, means for withdrawing diluted product from said dilution chamber, and a valved cross-over transfer conduit connecting the filter chamber of one of said sedimentation chambers with another non-respective addition chamber for selective supply of filtered overflow to said other addition chamber, whereby fresh wastes are separately treated, allowed to settle and are then combined for dilution prior to discharge.

2. An apparatus according to claim 1 further including means for limiting the level of the liquid effluent in each of said addition chambers, which level-limiting means switch the respective circulating pump on or off.

3. An apparatus according to claim 1 further including a respective supply vessel for each of said treating substances, said vessels being located above said addition chambers so as to feed thereto by gravity.

* * * * *